United States Patent
Nishida (10) Patent No.: US 11,934,747 B2
(45) Date of Patent: Mar. 19, 2024

(54) SIMULATION APPARATUS

(71) Applicant: HONDA MOTOR CO., LTD., Tokyo (JP)

(72) Inventor: Yoshikazu Nishida, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 520 days.

(21) Appl. No.: 17/194,328

(22) Filed: Mar. 8, 2021

(65) Prior Publication Data
US 2021/0286920 A1    Sep. 16, 2021

(30) Foreign Application Priority Data
Mar. 10, 2020    (JP) ................ 2020-041038

(51) Int. Cl.
| | | |
|---|---|---|
| G06F 30/20 | (2020.01) | |
| G07C 5/08 | (2006.01) | |
| H01M 10/42 | (2006.01) | |

(52) U.S. Cl.
CPC .......... *G06F 30/20* (2020.01); *G07C 5/0808* (2013.01); *H01M 10/4285* (2013.01); *H01M 2220/20* (2013.01)

(58) Field of Classification Search
CPC ...... G06F 30/20; G06F 2119/06; G06F 30/15; G07C 5/0808; H01M 10/4285; H01M 2220/20
See application file for complete search history.

(56) References Cited

U.S. PATENT DOCUMENTS

| | | | | |
|---|---|---|---|---|
| 9,610,853 | B1* | 4/2017 | Miller | B60L 53/60 |
| 9,834,196 | B2* | 12/2017 | Morisaki | B60W 10/06 |
| 10,491,748 | B1* | 11/2019 | Wu | H04M 3/5233 |
| 11,155,181 | B2* | 10/2021 | Shin | B60H 1/00392 |
| 11,486,720 | B2* | 11/2022 | Blumentritt | B60W 30/182 |
| 2006/0236970 | A1* | 10/2006 | Inada | F02N 11/0825 |
| | | | | 307/10.3 |
| 2006/0237242 | A1* | 10/2006 | Burke | B62D 31/025 |
| | | | | 180/65.265 |
| 2010/0292877 | A1* | 11/2010 | Lee | B60L 50/66 |
| | | | | 180/68.5 |
| 2014/0055094 | A1 | 2/2014 | Takagi et al. | |
| 2014/0277872 | A1* | 9/2014 | MacNeille | G06F 17/00 |
| | | | | 701/22 |

(Continued)

FOREIGN PATENT DOCUMENTS

| | | | |
|---|---|---|---|
| JP | 2007506395 A | 3/2007 | |
| JP | 2012235610 A | 11/2012 | |

(Continued)

*Primary Examiner* — Joseph J Dallo
(74) *Attorney, Agent, or Firm* — CKC & Partners Co., LLC (57) ABSTRACT

To provide a simulation apparatus capable of simulating the performance of a vehicle according to the battery to be mounted. A simulation apparatus (100) includes a battery performance acquisition unit (111) that acquires performance information of a battery that can be mounted on a vehicle, a vehicle information acquisition unit (112) that acquires vehicle information of the vehicle, and a simulation unit (113) that simulates vehicle performance of the vehicle and battery characteristics of the battery based on the performance information of the battery and the vehicle information.

4 Claims, 7 Drawing Sheets

(56) References Cited

U.S. PATENT DOCUMENTS

| | | | | |
|---|---|---|---|---|
| 2015/0114739 A1* | 4/2015 | Newman | ................. | B60L 58/15 |
| | | | | 180/65.245 |
| 2016/0280071 A1* | 9/2016 | Newman | ................. | B60L 1/003 |
| 2021/0286920 A1* | 9/2021 | Nishida | ................... | G06F 30/20 |

FOREIGN PATENT DOCUMENTS

| | | | | | |
|---|---|---|---|---|---|
| JP | 2013102590 | A | | 5/2013 | |
| JP | 2015028725 | A | | 2/2015 | |
| JP | 2018019580 | A | * | 2/2018 | |
| KR | 20190131450 | A | | 11/2019 | |
| WO | 2005027345 | A1 | | 3/2005 | |
| WO | WO-2012045145 | A1 | * | 4/2012 | ........... B62D 21/183 |
| WO | WO-2016105247 | A1 | * | 6/2016 | ............... B60V 3/02 |
| WO | WO-2018055422 | A1 | * | 3/2018 | ............... B60K 6/08 |

* cited by examiner

SIMULATION APPARATUS

This application is based on and claims the benefit of priority from Japanese Patent Application No. 2020-041038, filed on 10 Mar. 2020, the content of which is incorporated.

BACKGROUND OF THE INVENTION

Field of the Invention

The present invention relates to a simulation apparatus.

Related Art

Conventionally, techniques for simulating various situations and parameters of a vehicle have been proposed. For example, the simulation system disclosed in Patent Document 1 performs simulation of vehicle running based on one model selected from a plurality of models for each vehicle behavior influence factor that affects vehicle behavior, and evaluates a given vehicle performance in accordance with the result of the simulation.

Patent Document 1: Japanese Unexamined Patent Applications, Publication No. 2015-28725

SUMMARY OF THE INVENTION

Recently, electric vehicles and hybrid vehicles equipped with batteries for running have become increasingly popular. Since the weight of the vehicle-mounted battery mounted on an electric vehicle or the like accounts for the majority of the weight of the vehicle, it affects the vehicle performance. With the popularization of vehicles equipped with batteries, it is conceivable that various types of batteries with different performance and weight manufactured by various manufacturers will be distributed. Accordingly, an object of the present invention is to provide a simulation apparatus capable of simulating the performance of a vehicle according to the battery to be mounted.

A simulation apparatus according to the present invention (e.g., the simulation apparatus 100 described later) includes a battery performance acquisition unit (e.g., the battery performance acquisition unit 111 described later) that acquires performance information of a battery that can be mounted on a vehicle, a vehicle information acquisition unit (e.g., the vehicle information acquisition unit 112 described later) that acquires vehicle information of the vehicle, and a simulation unit (e.g., the simulation unit 113 described later) that simulates vehicle performance of the vehicle and battery characteristics of the battery based on the performance information of the battery and the vehicle information.

The battery performance acquisition unit acquires the performance information of a plurality of the batteries having different performance.

The vehicle information includes weight information of the vehicle.

The performance information of the battery includes a battery output characteristic, a battery capacity characteristic, and battery weight.

The vehicle performance of the vehicle includes a braking characteristic, an acceleration characteristic, and driving range.

According to the present invention, it is possible to provide the simulation apparatus capable of simulating the performance of a vehicle according to the battery to be mounted.

DETAILED DESCRIPTION OF THE INVENTION

Figure 1:
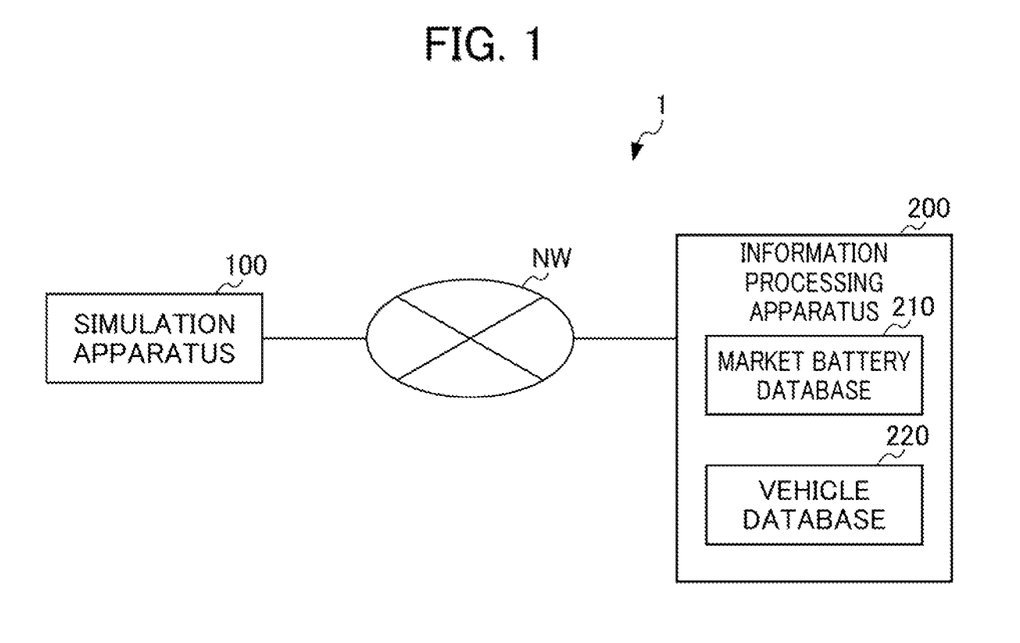
FIG. 1 is a diagram showing an example of a configuration of a simulation system according to the present embodiment.

An embodiment of a simulation apparatus of the present invention will be described below with reference to the drawings. FIG. 1 is a diagram showing an example of a configuration of a simulation system 1 according to the present embodiment. As shown in FIG. 1, the simulation system 1 includes a simulation apparatus 100 and an information processing apparatus 200.

The simulation apparatus 100 simulates vehicle performance of a vehicle and battery characteristics of a battery. The simulation apparatus 100 is communicably connected to the information processing apparatus 200 via a network NW. The simulation apparatus 100 accesses the information processing apparatus 200, and acquires information from a market battery database 210 and a vehicle database 220 of the information processing apparatus 200.

The information processing apparatus 200 is communicably connected to the simulation apparatus 100 via the network NW. The information processing apparatus 200 includes the market battery database 210 that stores performance information, characteristic information, and the like of batteries on the market, and the vehicle database 220 that stores performance information, characteristic information, and the like of the vehicle.

The market battery database 210 may store various information such as battery capacity, battery weight, battery voltage/current characteristics, battery internal impedance characteristics, management temperature range, operation guaranteed temperature range, battery type, battery material, battery size, capacity maintenance rate, output maintenance rate, sales prices, remaining life (estimated value), manufacturer, model, and date of manufacture.

Figure 2:
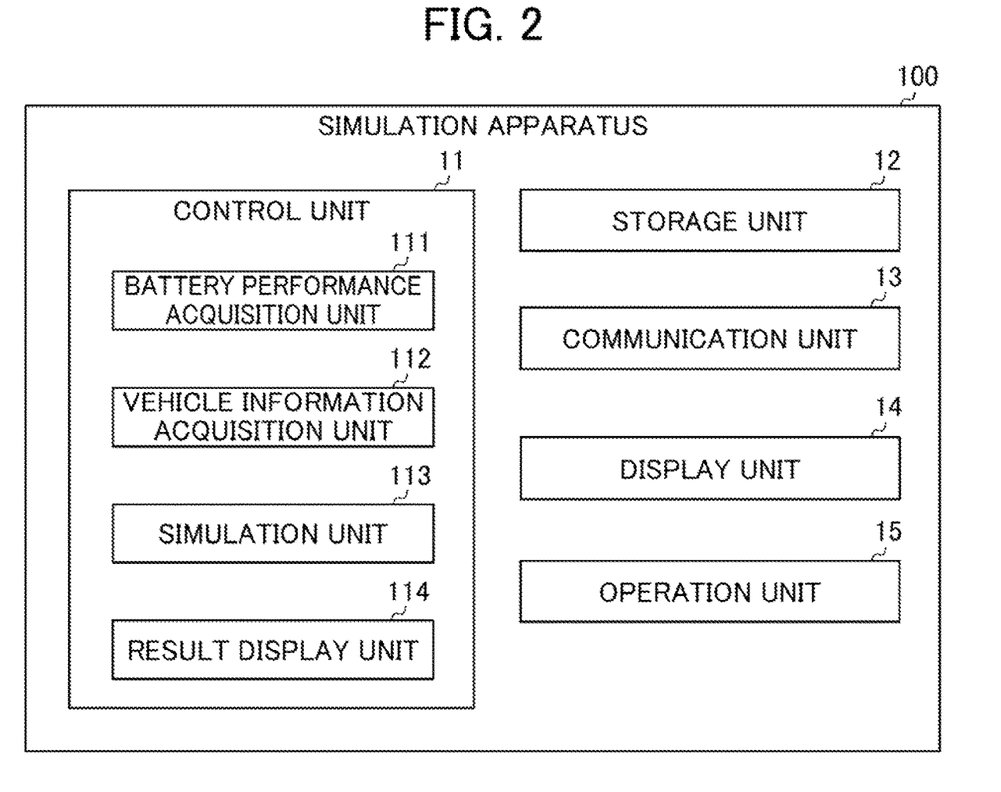
FIG. 2 is a diagram showing an example of a configuration of a simulation apparatus.

FIG. 2 is a diagram showing an example of a configuration of the simulation apparatus 100. As shown in FIG. 2, the simulation apparatus 100 includes a control unit 11, a storage unit 12, a communication unit 13, a display unit 14, and an operation unit 15.

The control unit 11 is realized, for example, by a hardware processor such as a CPU (central processing unit) executing a program (software). Some or all of these constituent elements may be realized by hardware (circuit unit; including a circuitry) such as an LSI (large scale integration) or an ASIC (application specific integrated circuit), an FPGA (field-programmable gate array), or a GPU (graphics processing unit) may be realized by cooperation of software and hardware. The program may be stored in advance in a storage device (a storage device including a non-transient storage medium) such as an HDD (hard disk drive) or a flash memory, or may be stored in a removable storage medium (a non-transient storage medium) such as a DVD or a CD-ROM and installed when the storage medium is inserted to a drive device.

The storage unit 12 is realized, for example, by a storage device including a non-transient storage medium such as an HDD (hard disk drive), a flash memory, an EEPROM (electrically erasable programmable read only memory), or a ROM (read only memory), or a RAM (random access memory), or the like.

The communication unit 13 is a communication interface for communicating with an external device such as a server via the network NW. The display unit 14 is a device that displays images. The display unit 14 is, for example, an LCD (liquid crystal display), an organic EL (electroluminescence), or the like.

The operation unit 15 includes buttons and the like for operating the display unit 14. The display unit 14 and the operation unit 15 may be a touch panel in which these functions are integrally configured. In this instance, the operation unit 15 may be GUI (graphical user interface) switches displayed on the display unit 14. The operation unit 15 may be mechanical buttons.

The processing of the control unit 11 will be described. As shown in FIG. 2, the control unit 11 includes a battery performance acquisition unit 111, a vehicle information acquisition unit 112, a simulation unit 113, and a result display unit 114.

The battery performance acquisition unit 111 acquires performance information of batteries that can be mounted on the vehicle. Specifically, the battery performance acquisition unit 111 acquires the performance information of a plurality of batteries having different performance from the market battery database 210. The performance information of the battery includes a battery output characteristic, a battery capacity characteristic, and battery weight.

The market battery database 210 may be stored in the storage unit 12 instead of the information processing apparatus 200. In this case, the battery performance acquisition unit 111 may acquire the performance information of the battery from the market battery database stored in the storage unit 12.

The vehicle information acquisition unit 112 acquires the vehicle information of the vehicle. Specifically, the vehicle information acquisition unit 112 acquires the vehicle information including the weight information of the vehicle from the vehicle database 220.

The vehicle database 220 may be stored in the storage unit 12 instead of the information processing apparatus 200. In this case, the vehicle information acquisition unit 112 may acquire the vehicle information from the vehicle database stored in the storage unit 12.

The simulation unit 113 simulates the vehicle performance of the vehicle and the battery characteristics of the battery based on the performance information of the battery and the vehicle information. The vehicle performance of the vehicle includes a braking characteristic, an acceleration characteristic, and driving range. The battery characteristics include an output characteristic and a capacity characteristic.

As will be described below, a braking characteristic is affected by the weight of the vehicle, and the weight and the output characteristic of the battery. The acceleration characteristic is affected by the weight of the vehicle, the weight of the battery, and the output characteristic of the battery.

The driving range is affected by the weight of the vehicle and the capacity characteristic of the battery. Along with the vehicle performance of the vehicle and the battery characteristics of the battery, the simulation unit 113 may also simulate the average fuel consumption of the vehicle, the degradation state of the battery, the remaining life of the battery, and the like.

The result display unit 114 displays on the display unit 14 the results of the simulation performed by the simulation unit 113. Thus, the information processing apparatus 200 can notify the user of the vehicle performance of the simulated vehicle and battery characteristics of the battery.

Figure 3:
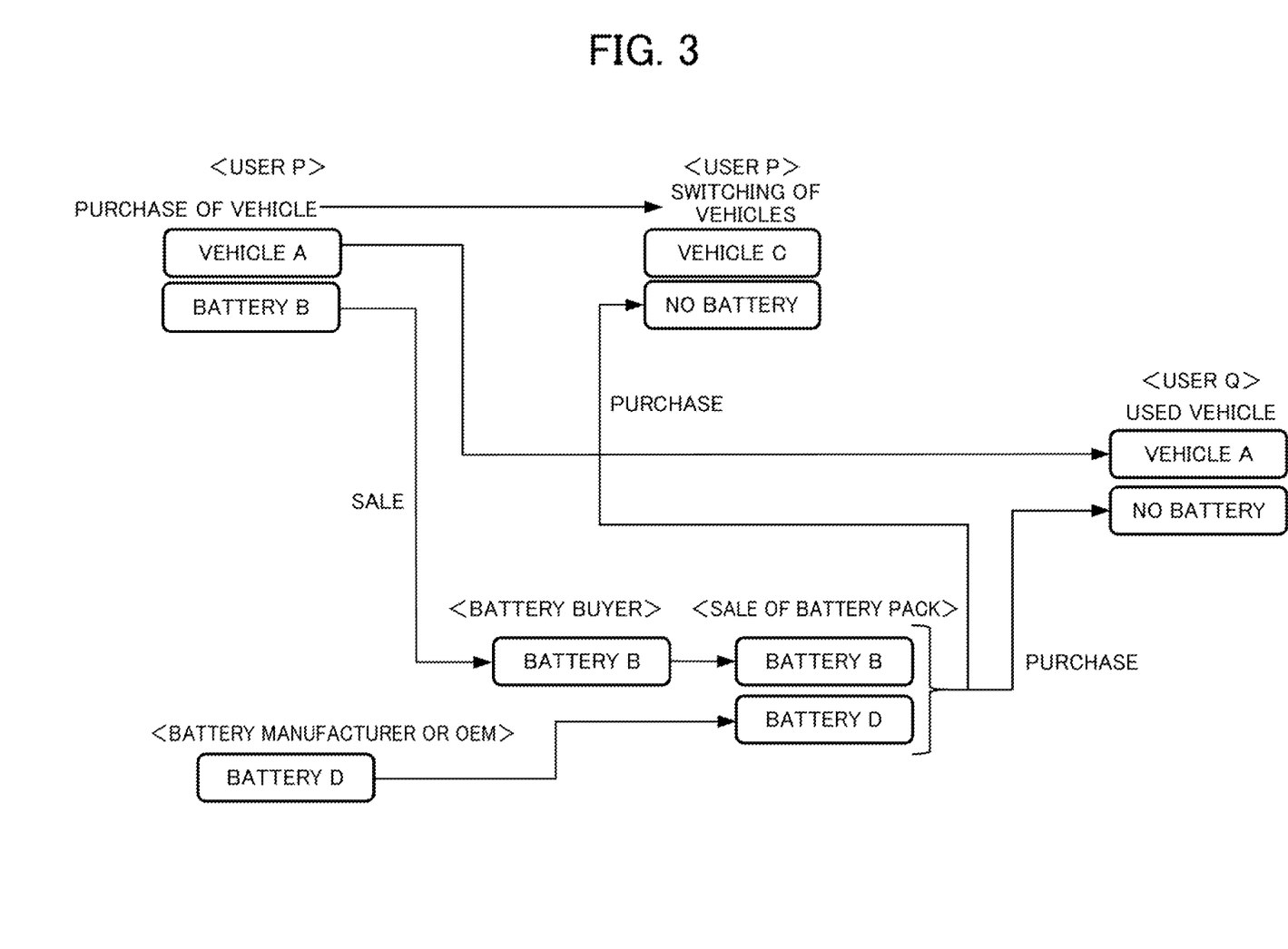
FIG. 3 is a diagram showing a distribution example of vehicles and batteries.

FIG. 3 is a diagram showing a distribution example between vehicles and batteries. As shown in FIG. 3, a user P who purchased a vehicle A including a battery B, sold the vehicle A and the battery B, and then switched to a vehicle C not including a battery, can purchase and use a combination of the battery B, which the user P previously sold, and a new battery D.

Alternatively, a user Q who purchased the vehicle A that does not include a battery as a used vehicle, can purchase the combination of the battery B, which the user P previously sold, and the new battery D, and use it in the vehicle A. The simulation apparatus 100 according to the present embodiment can provide simulation of the vehicle performance of the vehicle and the battery characteristics of the batteries when different types of batteries are combined to users who purchase vehicles and batteries separately in this way.

Figure 4:
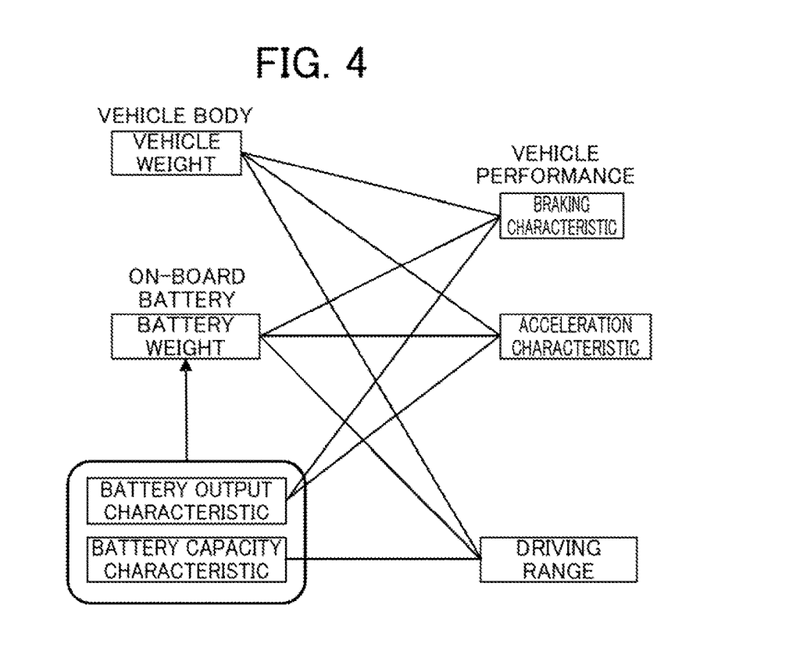
FIG. 4 is a diagram showing the relationship between vehicle weight and its effect on vehicle performance.

FIG. 4 is a diagram showing the relationship between vehicle weight and its effect on vehicle performance. As shown in FIG. 4, the performance information of the battery includes a battery output characteristic, a battery capacity characteristic, and battery weight. The information of the vehicle body includes the weight of the vehicle. The vehicle performance includes a braking characteristic, an acceleration characteristic, and driving range.

The battery has two characteristics: an output characteristic and a capacity characteristic. The battery output characteristic affects the braking characteristic and the acceleration characteristic of the vehicle. The battery capacity characteristic affects the driving range of the vehicle.

The battery weight affects the braking characteristic, the acceleration characteristic, and driving range of the vehicle. The vehicle weight affects the braking characteristic, the acceleration characteristic, and driving range of the vehicle. Thus, it can be seen that combining batteries having different performance affects vehicle performance.

Figure 5:
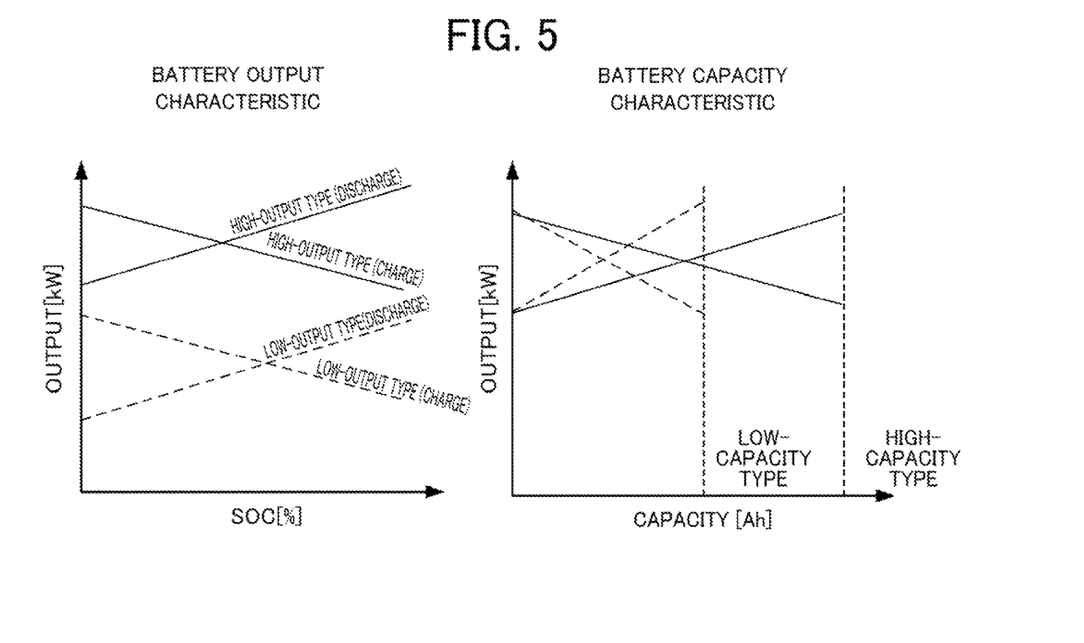
FIG. 5 is a diagram showing battery output characteristics and battery capacity characteristics.

FIG. 5 is a diagram showing battery output characteristics and battery capacity characteristics. As described above, the battery output characteristic affects the braking characteristic and the acceleration characteristic of the vehicle. As shown in the battery output characteristics in FIG. 5, there are a high-output type battery having a large output power both during charging and discharging, and a low-output type battery having a smaller output power both during charging and discharging then that of the high-output type battery.

As described above, the battery capacity characteristic affects the driving range of the vehicle. As shown in the battery capacity characteristics in FIG. 5, there are a low-capacity type battery having a low battery capacity and a high-capacity type battery having a high battery capacity.

Figure 6:
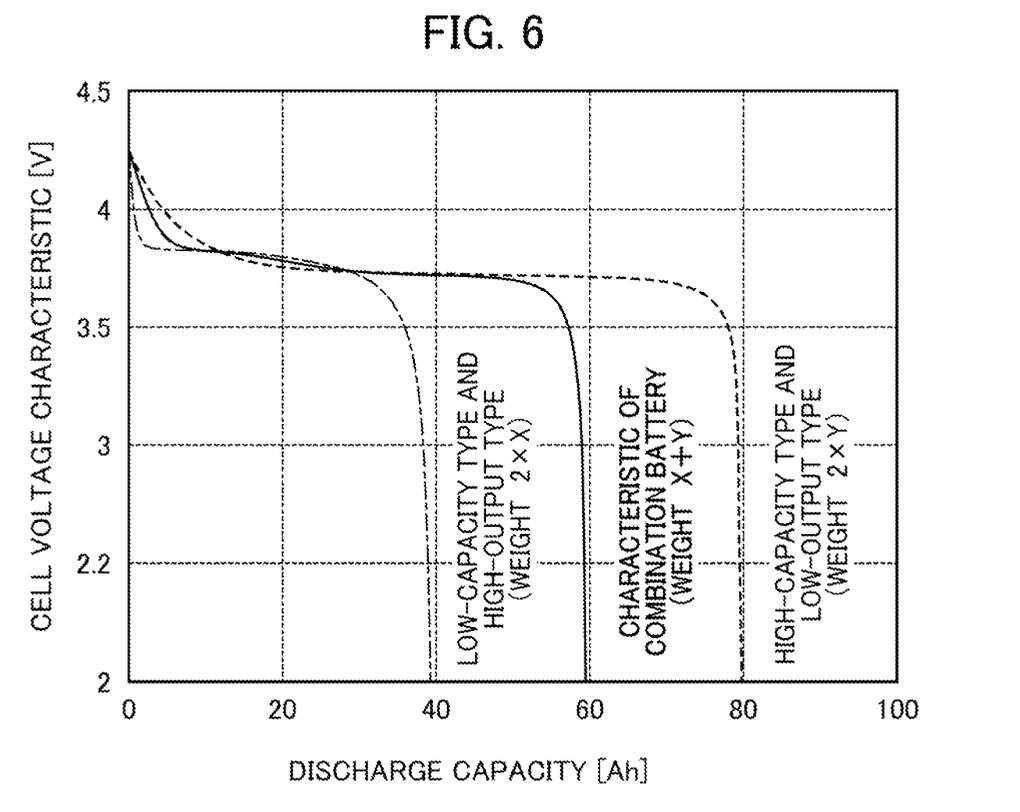
FIG. 6 is a diagram showing simulation results when the batteries shown in FIG. 5 are combined.

FIG. 6 is a diagram showing simulation results when the batteries shown in FIG. 5 are combined. When two low-capacity type and high-output type batteries (each weight: X) are combined in parallel, and when two high-capacity type and low-output type batteries (each weight: Y) are combined in parallel, the respective battery weights are doubled (2×X, 2×Y), and the battery characteristics are unchanged.

In contrast, when the low-capacity type and high-output type battery (weight X) and the high-capacity type and low-output type battery (weight Y) are combined in parallel, the battery characteristics were such that the discharge capacity was an intermediate value between that of the low-capacity type and that of the high-capacity type, and the cell voltage characteristic was an intermediate value between that of the high-output type and that of the low-output type. The weight of the batteries becomes X+Y, and the weight of the entire vehicle changes, and thus the vehicle performance of the vehicle changes. Thus, the simulation unit 113 can simulate the battery characteristics of the battery.

Figure 7:
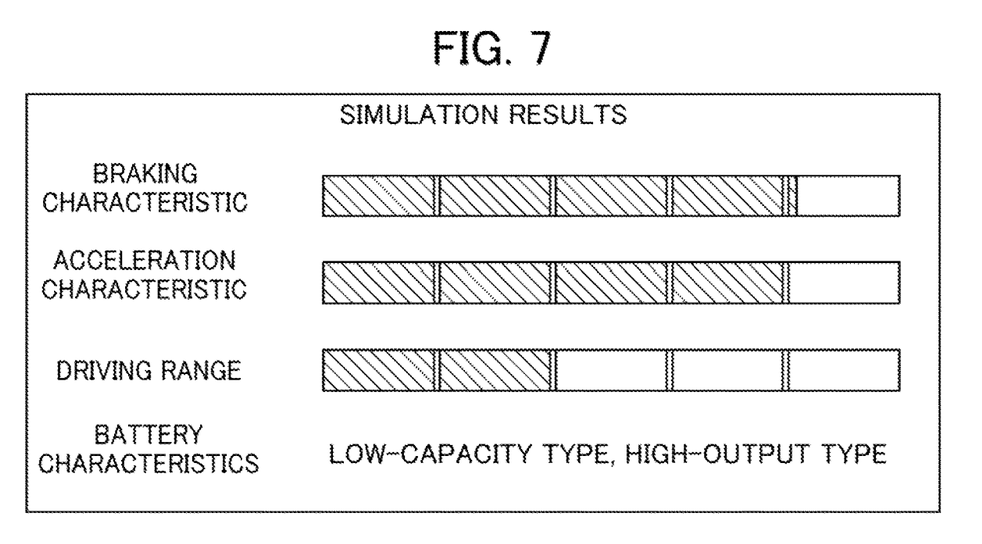
FIG. 7 is a diagram showing another example of simulation results.

FIG. 7 is a diagram showing another example of simulation results. As shown in FIG. 7, the results of the simulation of a braking characteristic, an acceleration characteristic, and driving range performed by the simulation unit 113 are indicated by a rough grade evaluation, and the simulation results of the battery characteristics are represented by the typology or type indicating the characteristics of the battery. This allows the user to know the vehicle performance of the simulated vehicle and the battery characteristics of the battery.

Figure 8:
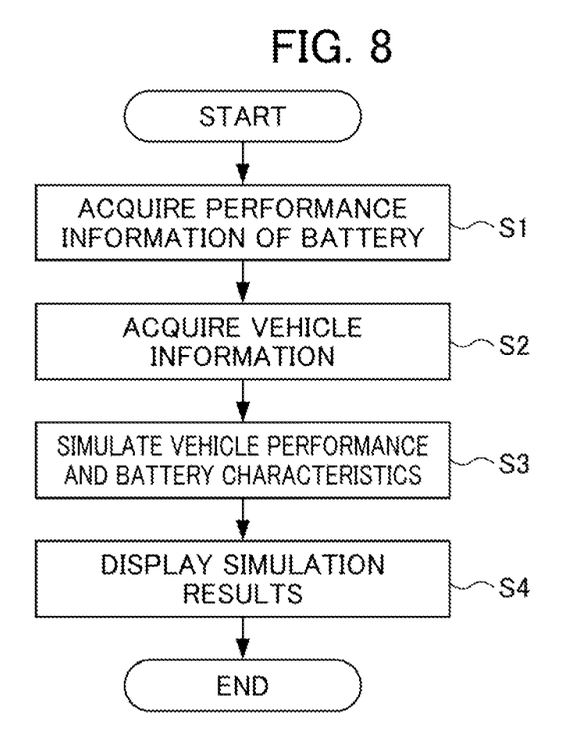
FIG. 8 is a flowchart showing the flow of processing of the simulation apparatus.

FIG. 8 is a flowchart showing the flow of processing of the simulation apparatus 100. In step S1, the battery performance acquisition unit 111 acquires the performance information of the battery that can be mounted on the vehicle. In step S2, the vehicle information acquisition unit 112 acquires the vehicle information of the vehicle.

In step S3, the simulation unit 113 simulates the vehicle performance of the vehicle and the battery characteristics of the battery based on the performance information of the battery and the vehicle information. In step S4, the result display unit 114 displays on the display unit 14 the results of the simulation performed by the simulation unit 113.

According to the present embodiment, for example, the following effects can be achieved. The simulation apparatus 100 includes the battery performance acquisition unit 111 that acquires performance information of a battery that can be mounted on a vehicle, the vehicle information acquisition unit 112 that acquires vehicle information of the vehicle, and the simulation unit 113 that simulates vehicle performance of the vehicle and battery characteristics of the battery based on the performance information of the battery and the vehicle information. This allows the simulation apparatus 100 to simulate the vehicle performance of the vehicle and the battery characteristics of the battery according to the battery to be mounted, so that the user can know what performance and characteristics the vehicle will have according to the battery to be mounted.

The battery performance acquisition unit 111 acquires the performance information of a plurality of batteries having different performance. This allows the simulation apparatus 100 to perform simulation based on the performance information of various batteries on the market.

The vehicle information includes the weight information of the vehicle. The performance information of the battery includes a battery output characteristic, a battery capacity characteristic, and battery weight. The vehicle performance of the vehicle includes a braking characteristic, an acceleration characteristic, and driving range. This allows the simulation apparatus 100 to perform simulation, taking into account information that affects the vehicle performance of the vehicle and the battery characteristics of the battery.

While an embodiment of the present invention has been described above, the present invention is not limited thereto. Within the spirit of the present invention, the configuration of details may be changed as appropriate.

EXPLANATION OF REFERENCE NUMERALS 1 simulation system
11 control unit
12 storage unit
13 communication unit
14 display unit
15 operation unit
111 battery performance acquisition unit
112 vehicle information acquisition unit
113 simulation unit
100 simulation apparatus
200 information processing apparatus

What is claimed is:

1. A simulation apparatus, comprising:
a battery performance acquisition unit configured to acquire performance information of a battery that can be mounted on a vehicle;
a vehicle information acquisition unit configured to acquire vehicle information of the vehicle; and
a simulation unit configured to simulate vehicle performance of the vehicle and battery characteristics of the battery based on the performance information of the battery and the vehicle information, wherein
the battery performance acquisition unit acquires the performance information of a plurality of the batteries having different types and different performance,
the simulation unit simulates a vehicle performance of the vehicle when the plurality of the batteries having different types and different performance are combined,
the performance information of the battery includes a battery output characteristic and a battery capacity characteristic,
the battery output characteristic includes a high-output type having a large output power both during charging and discharging, and a low-output type battery having a smaller output power both during charging and discharging than that of the high-output, type,
the battery capacity characteristic includes a low-capacity type having a low battery capacity and a high-capacity type having a high battery capacity, and
a result of a simulation by the simulation unit indicates the battery characteristics when two low-capacity type and high-output type batteries are combined in parallel, when two high-capacity type and low-output type batteries are combined in parallel, and the low-capacity type and high-output type battery and the high-capacity type and low-output type battery are combined in parallel.

2. The simulation apparatus according to claim 1, wherein the vehicle information comprises weight information of the vehicle.

3. The simulation apparatus according to claim 1, wherein the performance information of the battery comprises battery weight.

4. The simulation apparatus according to claim 1, wherein the vehicle performance of the vehicle comprises a braking characteristic, an acceleration characteristic, and driving range.

* * * * *